March 18, 1969     E. R. BAEZ ET AL     3,433,940

FIBER OPTICS INSTRUMENT LIGHTING

Filed June 7, 1967

INVENTORS
EDGAR R. BAEZ
WALTER M. HEINKE
ALFRED NELKEN

By

ATTORNEY

United States Patent Office 3,433,940
Patented Mar. 18, 1969

3,433,940
FIBER OPTICS INSTRUMENT LIGHTING
Edgar R. Baez, Evanston, and Walter M. Heinke and Alfred Nelken, Chicago, Ill., assignors to Stewart-Warner Corporation, Chicago, Ill., a corporation of Virginia
Filed June 7, 1967, Ser. No. 644,335
U.S. Cl. 240—2.1                11 Claims
Int. Cl. G01d 11/28

ABSTRACT OF THE DISCLOSURE

A light dispersing member for achieving uniform low intensity area illumination of an instrument dial from the terminal end of a fiber optics cable within the instrument casing comprising a unitary block of transparent material of trapezoidal shape, including a bore within one surface for receiving the terminal end of said fiber optics cable, with the inclined surface of the trapezoidal block facing the light transmitting instrument dial.

---

Optical systems including fiber optics cables or solid rods of transparent material have been used, especially in the past few years for remote illumination of various indicators. In the automotive field, accessories such as cigarette lighters, ash trays, turn signals, etc., have been illuminated remotely by either individual lamps or a common light source. They have not, however, been used to any extent to light the dials of instruments carried on the automobile dashboard, in spite of the many advantages that might be gained from their use. Not only may a plurality of instruments be illuminated from a single light source, but the location of the light source outside of the instrument casing eliminates any heating problems attendant to the conventional location of the light bulb within the instrument casing.

Most automobile dashboard instruments comprise a cylindrical casing which includes an open end covered by a light transmitting instrument dial, the dial being normally coplanar to the automobile dashboard. To illuminate the dial for night driving, it is conventional to edge light the light transmitting dial. Alternatively, reflected light from an exterior source may be used. A third method of achieving dial illumination involves the employment of one or more light bulbs positioned within the instrument casing, beneath the light transmitting dial and adjacent the instrument mechanism.

Obvious deficiencies are presented by all three courses of action. The presence of the light bulb within the casing and beneath the light transmitting dial, in the case of a translucent dial, causes the presence of a bright spot due to the confined source lighting. Reflecting light from a dial which is normally opaque through the use of an exterior light source is not only inefficient but the added problem of placement of the exterior light source, in most cases, greatly restricts this method of application. Edge lighting of a light transmitting instrument dial has also proved to be unsatisfactory in many cases.

It is, therefore, a principal object of the present invention to provide a light dispersing member for a terminal end of a fiber optics cable for achieving uniform, low intensity area illumination of a light transmitting instrument dial.

It is a further object of this invention to provide a light dispersing member of this type which is unitary, and may be readily attached to the cable terminal end.

It is a further object of this invention to provide a light dispersing member for use with a light transmitting instrument dial which eliminates any light spot in the area of the terminal end of the fiber optics cable.

It is a further object of this invention to provide a light dispersing member which achieves uniform low intensity area illumination of an instrument dial, without attendant thermal problems from the light source.

Further objects of this invention will be pointed out in the following detailed description and claims and illustrated in the accompanying drawing, which discloses, by way of example, the principle of this invention and the best modes which have been contemplated of applying those principles.

In general, the invention comprises a light dispersing member for achieving uniform low intensity area lighting at the terminal end of a fiber optics cable, particularly in conjunction with a light transmissive instrument dial. The light dispersing member consists of a unitary trapezoidal block of transparent material including a bore for receiving the terminal end of the fiber optics cable and a thin coating of reflecting or translucent material covering the inclined surface of the trapezoidal member. The inclined surface may be flat or concave longitudinally. An integral tubular extension may be provided on the surface opposite the inclined surface to both receive the terminal end of the fiber optics cable, while at the same time, acting to lock and frictionally maintain the light dispersing member in position within the instrument casing carrying the translucent dial.

Figure 1:
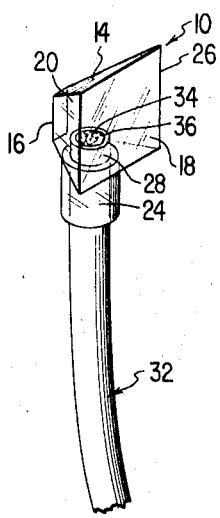
FIGURE 1 is a perspective of one embodiment of the light dispersing member of the present invention coupled to the terminal end of a fiber optics cable.
Figure 2:
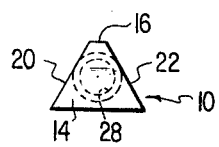
FIGURE 2 is a plan view of the light dispersing member shown in FIGURE 1.
Figure 3:
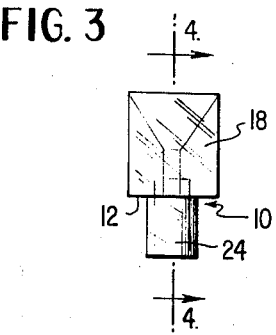
FIGURE 3 is a front elevational view of the light dispersing member shown in FIGURE 1.

Referring to FIGURES 1 through 5 of the drawing, there is shown one embodiment of the light dispersing member of the present invention. The light dispersing member 10 is unitary in constrruction, and is fabricated of a crystal-clear material, such as Lucite, plexiglass or a polycarbonate, such as "Lexan" (a registered trademark of the General Electric Company). The light dispersing member 10 is trapezoidal in shape having, in the position shown, a horizontal bottom surface 12, a flat, inclined top surface 14, a small vertical rear surface 16, a much larger rectangular front surface 18 and a pair of side surfaces 20 and 22, which diverge from the rear surface 16 toward front surface 18. A cylindrical extension section 24 is integrally formed with the trapezoidal light dispersing section of the member 10. A vertical bore 28, extends inwardly from the outer end 30 of the cylindrical section 24 to a point beyond the plane of the horizontal bottom surface 12 of the light dispersing section 26. The purpose of bore 28 is to allow ready attachment of the terminal end 30 of a fiber optics cable 32 to the light dispersing member 10. The fiber optics cable 32 is conventional and employs a great number of light transmitting, clear glass fibers or its equivalent which is surrounded by an exterior opaque coating 36 (FIGURE 1).

Figure 4:
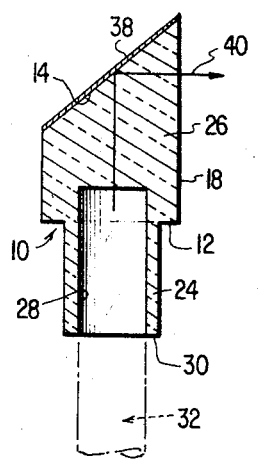
FIGURE 4 is a sectional elevation of the light dispersing member shown in FIGURE 3 taken about lines 4—4.

In the embodiment shown in FIGURES 1 through 4, the inclined surface 14 of the unitary light dispersing member 10 is coated with a thin layer 38 of opaque material which acts to reflect the light entering member 10. With the assembly of FIGURE 1 oriented in the manner shown, most of the light is reflected horizontally through the large frontal surface 18 of the trapezoidal light dispersing member, as indicated by the bent arrow 40 (FIGURE 4).

The present invention resides in the unitary light dispersing member of trapezoidal configuration and may be coupled to a fiber optics light transmission means in the form of either a multiple fiber optics cable or alternatively, in a single element rod of transparent, light conductive material. If the diameter of the terminal end of the fiber optics cable is only slightly less than the diameter of bore 28, a frictional fit is achieved between these two members. With the opaque coating 38 covering the inclined surface 14, the majority of the light will pass outwardly of the light dispersing member through the vertical front surface 18. Since the other surfaces are free of the opaque coating 38, some light will pass through the side, rear and bottom surfaces 20, 22 and 12.

Figure 5:
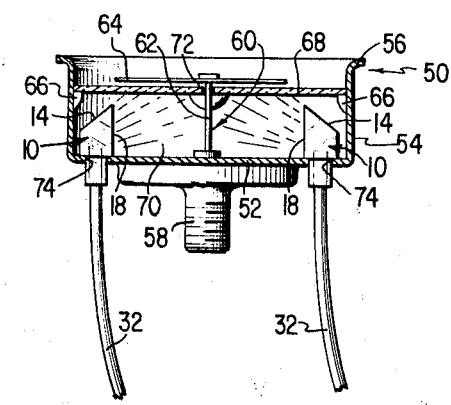
FIGURE 5 is an elevational view, in section, of an illuminated instrument employing a pair of opposed light dispersing members shown in FIGURE 1 for illuminating the instrument dial.
Figure 6:
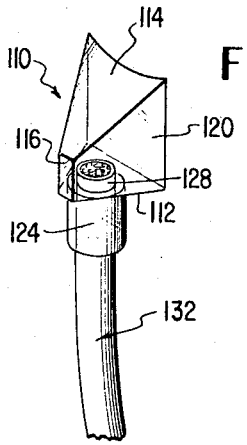
FIGURE 6 is a perspective view of a second embodiment of the light dispersing member of the present invention as coupled to the terminal end of a fiber optics cable.

The improved light dispersing member of the present invention suitably facilitates illumination of a given area from a remote source through the use of a light transmitting fiber optics cable or its equivalent. The improved light dispersing member in either form has ready application to the automotive field, specifically for the purpose of achieving uniform, low intensity area illumination of an instrument dial. In this respect, reference to FIGURE 5 shows a typical automotive instrument, including a cylindrical casing 50 having a generally closed end wall 52 and a cylindrical side wall 54 which terminates in a flanged lip 56 to provide an open end to the casing. In conventional fashion, the bottom or end wall 52 includes threaded coupling means 58 for attachment to an instrument support member, while at the same time, allowing the instrument mechanism 60, carried by the casing, to be coupled to actuating means (not shown), exterior of the instrument. The mechanism 60 shown as being centrally located includes a shaft 62, to which is attached a pointer 64 at its outer end. A number of dial supporting tabs 66 are carried by the inner surface of the cylindrical side wall 54. A disk-like instrument indicating dial 68, formed of light transmitting material and carrying suitable indicia, is supported by the tabs and forms in conjunction with the instrument casing 50 a somewhat closed chamber 70 holding the instrument mechanism 60. The light transmitting dial member 68 is provided with a small opening 72, at the center thereof for receiving shaft 62 carrying the movable instrument pointer 64.

The type of operating instrument mechanism and in fact, the configuration of the instrument dial is unimportant to the instant invention, with the exception that the dial 68 must be light transmitting. Preferably, it is translucent so that it acts, in conjunction with the light dispersing members 10, on opposite sides of the chamber 70, and adjacent the inner surface of the side wall, to produce a uniform, low intensity area illumination of the complete surface area of the dial 68.

Another aspect of the present invention involves the manner of coupling the light dispersing member to the instrument casing. The bottom wall 52 of the instrument casing 50 is provided with oppositely disposed apertures 74, which in the case of an instrument employing two light dispersing members and two fiber optics cables are circumferentially spaced 180° from each other. The apertures 74 are of a diameter slightly greater than the outside diameter of the cylindrical section 24 of the light dispersing members 10. Thus, not only are the terminal ends of the fiber optics cables frictionally held within the unitary light dispersing member 10, but also the light dispersing members have their axes oriented parallel to the axis of the instrument casing with cylindrical extension members 24 being frictionally held within respective apertures 74 of the casing. Generally, two optic fiber cables and two light dispersing members are required for each instrument because of the shadows caused by the mechanism 60 being located centrally within the casing. However, one or more suitably placed light dispersing members 10 may be used to obtain a desired lighting effect. It is to be noted that the inclined upper surfaces 14 of the trapezoidal shaped light dispersing members face the bottom surface of the spaced light transmitting instrument dial 68. With the surfaces 14 being coated by a thin layer of opaque material 38, the major portion of the light escapes through the large area vertical front surface 18 of the unitary light dispersing members and impinges upon the bottom surface of the light transmitting dial 68. With the use of one or more of the light dispersing members of the present invention, uniform low intensity illumination of the dial is achieved, providing a most desirable effect especially with regard to automotive instrumentation. The fiber optics cables 32 may be illuminated from a single remote source of illumination (not shown) or may receive their light from individual light sources if this is desired.

Figure 9:
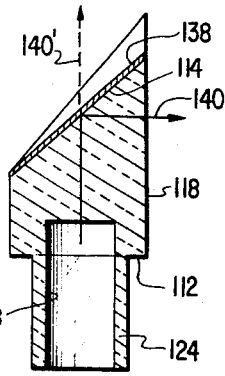
FIGURE 9 is a sectional elevation of the light dispersing member shown in FIGURE 8 taken about lines 9—9.
Figure 7:
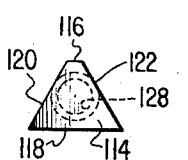
FIGURE 7 is a plan view of the embodiment of FIGURE 6.
Figure 8:
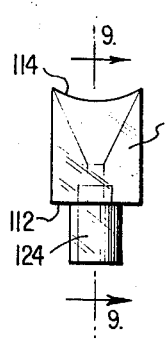
FIGURE 8 is a front elevational view of the light dispersing member shown in FIGURE 6.
Figure 8:
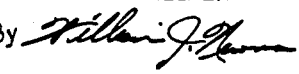

Referring to FIGURES 6 through 9, inclusive, there is shown a second embodiment of the present invention. This embodiment, in the identical manner to the previous embodiment, employs a unitary block of crystal clear material which may be plastic, such as Lucite, plexiglass or a polycarbonate, although it could be formed of any other crystal clear material, such as glass. Again, the overall configuration of the dispersing member 110 is trapezoidal including, as oriented, a flat, horizontal, bottom surface 112, a flat, vertical rear surface 116, diverging side surfaces 120 and 122 and an enlarged vertical front surface 118 which transmits the major portion of the light from fiber optics cable 132. Again, extending downwardly from the bottom surface 112 is an integral cylindrical extension 124, which is tubular and includes a vertically oriented bore 128 to receive the terminal end 130 of the fiber optics cable 132. There are two major differences from light dispersing member 10'. The inclined top surface 114, in this embodiment, is not flat, but is concave. Further, rather than being coated with a thin coating of opaque material, it is coated with a translucent paint, thereby allowing some of the light to continue axially. Additionally, a portion of the light is reflected generally at right angles, and sidewise, the majority of which is dispersed through the large frontal surface area provided by surface 118. The portion of light reflected at right angles is indicated by arrow 140, while the portion transmitted axially through the translucent surface coating 138 is indicated by the dotted arrow 140' (FIGURE 9). Again, the cylindrical tubular extension portion 124 cooperates with the flat bottom surface 112 to allow assembly within an instrument casing. In all other respects, the manner of coupling of the light dispersing member 110 to the fiber optics cable 132 and the method of coupling this assembly to an instrument casing or like supporting member is identical to the embodiments shown in FIGURES 1 through 5. Depending upon the various effects desired, in either embodiment, a translucent or opaque coating may be applied to the inclined surface.

In both embodiments, while the majority of the light is dispersed forwardly through the large frontal surface of the light dispersing members, some light escapes from all surfaces not covered by reflective or translucent material, or blocked by an opaque supporting member, such as the casing itself. Further, while the crystal clear material forming the light dispersing member has been described specifically, it is not intended that the invention be limited to such material. Further, while one or more of the light transmitting means has been used in conjunction with fiber optics cables to produce uniform low intensity area illumination of an automobile instrument dial, the invention has broad application to the achievement of the same type of uniform area illumination for instruments in general, and in fact, has application broadly to the optical display field.

While there have been shown and described and pointed out the fundamental novel features of the invention as applied to preferred embodiments, it will be understood that various omissions and substitutions and changes in the form and detail of the devices illustrated and in their operation may be made by those skilled in the art without departing from the spirit of the invention. It is the intention, therefore, to be limited only as indicated by the scope of the following claims.

What is claimed is:

1. A light dispersing member for achieving uniform low intensity area lighting at the terminal end of a fiber optics cable, said dispersing member comprising: a unitary trapezoidal block of transparent material including a bore for receiving the terminal end of said fiber optics cable and a thin coating of reflecting material covering the inclined surface of said trapezoidal member to achieve major light dispersion in a direction away from said coated inclined surface.

2. The light dispersing member as claimed in claim 1 wherein the axis of said bore passes through said inclined surface.

3. The dispersing member as claimed in claim 2 wherein said reflecting coating consists of an opaque material.

4. The dispersing member as claimed in claim 2 wherein said coating on said inclined surface is translucent.

5. The light dispersing member as claimed in claim 2 wherein said inclined surface is longitudinally concave.

6. The light dispersing member as claimed in claim 5 wherein said inclined surface is translucent.

7. In an instrument to be illuminated from a remote light source by fiber optics cable means including a cylindrical casing having an open end, a light transmissive instrument dial covering said casing opening and forming therewith an instrument mechanism receiving chamber, the improvement comprising: a light dispersing member, fiber optics cable means operatively coupled to said light dispersing member and said remote light source, said light dispersing member comprising a unitary block of transparent material, trapezoidal in shape, and means for supporting said light dispersing member within said chamber adjacent said instrument mechanism with the inclined surface facing the bottom of said light transmissive instrument dial and major light transmissive surface directed toward said mechanism.

8. The apparatus as claimed in claim 7 further including a thin opaque coating covering said inclined surface of said light dispersing member.

9. The apparatus as claimed in claim 7 further including a thin coating of translucent material covering said inclined surface of said light dispersing member.

10. The apparatus as claimed in claim 9 wherein said inclined surface is longitudinally concave.

11. The apparatus as claimed in claim 7 wherein; said light dispersing member includes an integral, tubular section on the side opposite said inclined surface, including a bore for receiving a fiber optics cable terminal end, and said apparatus further includes; a hole formed within said casing opposite said light transmissive instrument dial, and said integral, cylindrical section being received within said hole to maintain said light dispersal member oriented with respect to said instrument mechanism.

References Cited

UNITED STATES PATENTS

| 2,737,573 | 3/1956 | Olthuis | 240—2.1 |
| 2,740,957 | 4/1956 | Davies | 240—1 XR |
| 2,804,540 | 8/1957 | Columbus | 240—8.16 |
| 2,837,053 | 6/1958 | Viret | 240—2.1 XR |

FOREIGN PATENTS 700,829  12/1953  Great Britain.

NORTON ANSHER, *Primary Examiner.*

DAVID S. STALLARD, *Assistant Examiner.*

U.S. Cl. X.R.

240—1; 88—1